United States Patent [19]

Eisele et al.

[11] 4,437,154

[45] Mar. 13, 1984

[54] DEVICE FOR GENERATING CONTROL SIGNALS WITH A PRIMARY CONTROL UNIT AND AN AUXILIARY CONTROL UNIT

[75] Inventors: Hermann Eisele, Schwieberdingen; Heinz Möller, Stuttgart; Manfred Schmitt, Heppenheim-Oberhambach, all of Fed. Rep. of Germany

[73] Assignee: Robert Bosch Gmbh, Stutgart, Fed. Rep. of Germany

[21] Appl. No.: 294,093

[22] Filed: Aug. 19, 1981

[30] Foreign Application Priority Data

Aug. 20, 1980 [DE] Fed. Rep. of Germany ....... 3031360

[51] Int. Cl.$^{3}$ ...................... G06F 15/46; G06F 11/16; G06F 15/16

[52] U.S. Cl. .............................. 364/187; 364/431.05; 371/9

[58] Field of Search ............................... 364/184–187, 364/431.04, 431.05, 431.08; 371/8, 9, 11

[56] References Cited

U.S. PATENT DOCUMENTS 3,786,433 1/1974 Notley et al. .................. 364/187 X 3,875,390 4/1975 Eccles et al. .................. 364/187 X 4,032,757 6/1977 Eccles ................................ 371/9 X 4,099,241 7/1978 Ossfeldt .............................. 371/9 X 4,205,374 5/1980 Bardsley et al. .................... 371/9 X 4,351,023 9/1982 Richer ................................ 364/187

*Primary Examiner*—Joseph F. Ruggiero

*Attorney, Agent, or Firm*—Edwin E. Greigg

[57] ABSTRACT

A device is proposed for generating control signals with a primary and an auxiliary control unit, having an error indication circuit layout and a subsequently disposed switchover device from the primary to the auxiliary control unit. The auxiliary control unit operates in parallel with the primary control unit and emits monitoring signals spaced apart in time from those of the primary control unit, which do not yet influence the consumer. If the device is put to use as an injection signal generator in internal combustion engines, then it is recommended that the auxiliary control unit emit its output signal either one cycle later, or 180° of crankshaft angle later, than does the primary control unit. The occurrence of the individual signals can be detected and evaluated. Upon the appearance of an error, the former auxiliary control circuit can then be switched over to become the primry control circuit; in that event, then a reversal must then be effected in the times when the individual pulses occur.

15 Claims, 3 Drawing Figures

DEVICE FOR GENERATING CONTROL SIGNALS WITH A PRIMARY CONTROL UNIT AND AN AUXILIARY CONTROL UNIT

BACKGROUND OF THE INVENTION

The invention is based on a device for generating repeated control signals for an electrical consumer with a primary control unit and an auxiliary control unit with a circuit for error recognition. A subsequently disposed switching device provides switchover from the primary to the auxiliary control unit. If maximum reliability in a control unit is required, then it is conventional to provide such a unit in duplicate, so that if there is a failure, a switchover can be made from the primary to the auxiliary control unit. As a rule, this is accomplished by mechanical switchover means; however, such means are subject to wear and thus represent a further source of uncertainty. Another source of difficulty is the problem of assuring that the mode of operation of the control unit will be reliable in every instance.

OBJECT AND SUMMARY OF THE INVENTION

The device according to the invention is characterized in that the auxiliary control unit operates in parallel with the primary control unit. The auxiliary control unit emits monitoring or control signals which are time-shifted with respect to the signals of the primary control unit, and do not yet influence the electrical consumer. With the present invention, the mechanical switches on the output side may be omitted. With such a device, it is furthermore possible to monitor the mode of operation of the auxiliary control circuit itself, this being done at the respective consumer at a particular time.

The field of application of the device according to the invention is fundamentally unlimited. The device may be put to use wherever the consumer is capable of being triggered supplementarily with pulses from the auxiliary control unit, these pulses being limited as to time and/or amplitude but not yet permitting a response on the part of the consumer.

An object of the present invention is to provide a switchover device between primary and auxiliary units which avoids the wear of parts associated with mechanical devices.

Another object of this invention is to provide a device which monitors the mode of the auxiliary unit without affecting the primary unit.

A further object of the invention is to provide a device which yields time-shifted monitoring signals from the primary and auxiliary units for distinct detection of the modes of each of these units.

Another object is to provide a device which provides primary and auxiliary monitoring signals that differ in amplitude for distinct detection of the modes of each of the primary and auxiliary units.

A still further object is to provide a device which reverses the pulse order of the auxiliary unit upon switchover to yield an uninterrupted and in-order firing of combustion engine cylinders.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
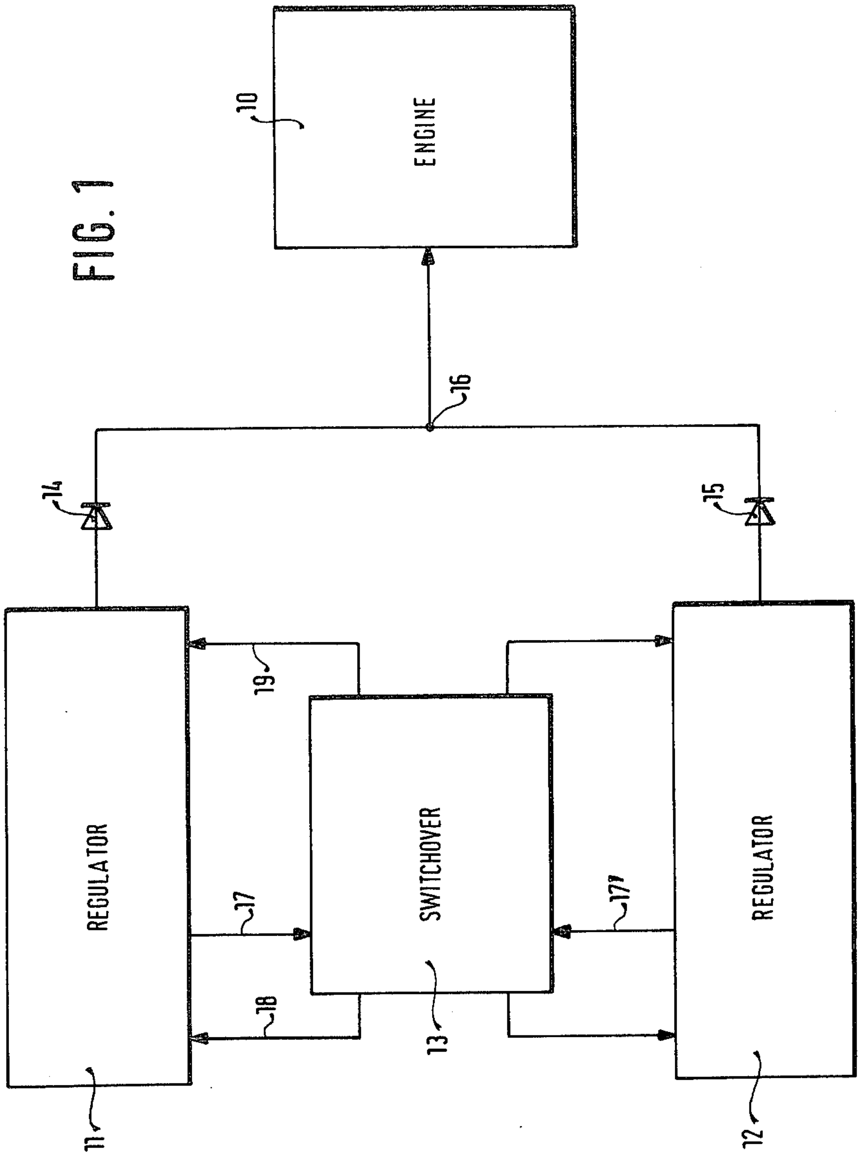
FIG. 1 is a block circuit diagram of the device according to the invention.

FIG. 1, in the form of a schematic block circuit diagram, illustrates the control unit for signals for electromagnetically actuatable injection valves in an internal combustion engine, such as a marine Diesel engine or, in general, any high-powered Diesel engine. The engine itself is represented by block 10, and it also includes the magnetic windings of the injection valves, the windings acting as consumers for the electrical trigger signals. A first regulator 11 and a second regulator 12 are shown; for the purposes of this description, regulator 11 will be designated as the primary control unit and regulator 12 as the auxiliary control unit. A switchover device 13 serves to detect errors, incorrect evaluation, and the switchover of the particular regulators 11 and 12 to the desired primary and auxiliary function. On the output side, the two regulators 11 and 12 are each coupled via one diode 14 and 15 with a connecting point 16, which is connected directly with the windings of the injection valves. Each of the regulators or control units 11 and 12 is coupled with the switchover device 13 via at least three lines 17, 18 and 19. Line 17 acts as a means of error indication, while line 18 acts as a switchover control line; via the connection 19, the output current can be established at predetermined values by means of the respective output diode (e.g., 14). The signal on the switchover line 18 determines whether a control unit (11, 12) is functioning as a primary or an auxiliary control unit.

In FIG. 1, the important point is that both the primary and the auxiliary control units generate output signals and, via the connecting point 16, trigger the respective magnetic valve. In order that the occurrence of the individual signals will also be detectable with assurance, the primary and the auxiliary control unit function with a certain degree of phase displacement. In the example of the high-powered Diesel engine, the auxiliary control unit triggers the cylinder which comes next in the ignition sequence. However, the auxiliary control signal is dimensioned (being shorter and/or having a smaller amplitude) such that the consumer still does not exhibit any response; as in this case, the injection valve will not yet open.

Figure 2:
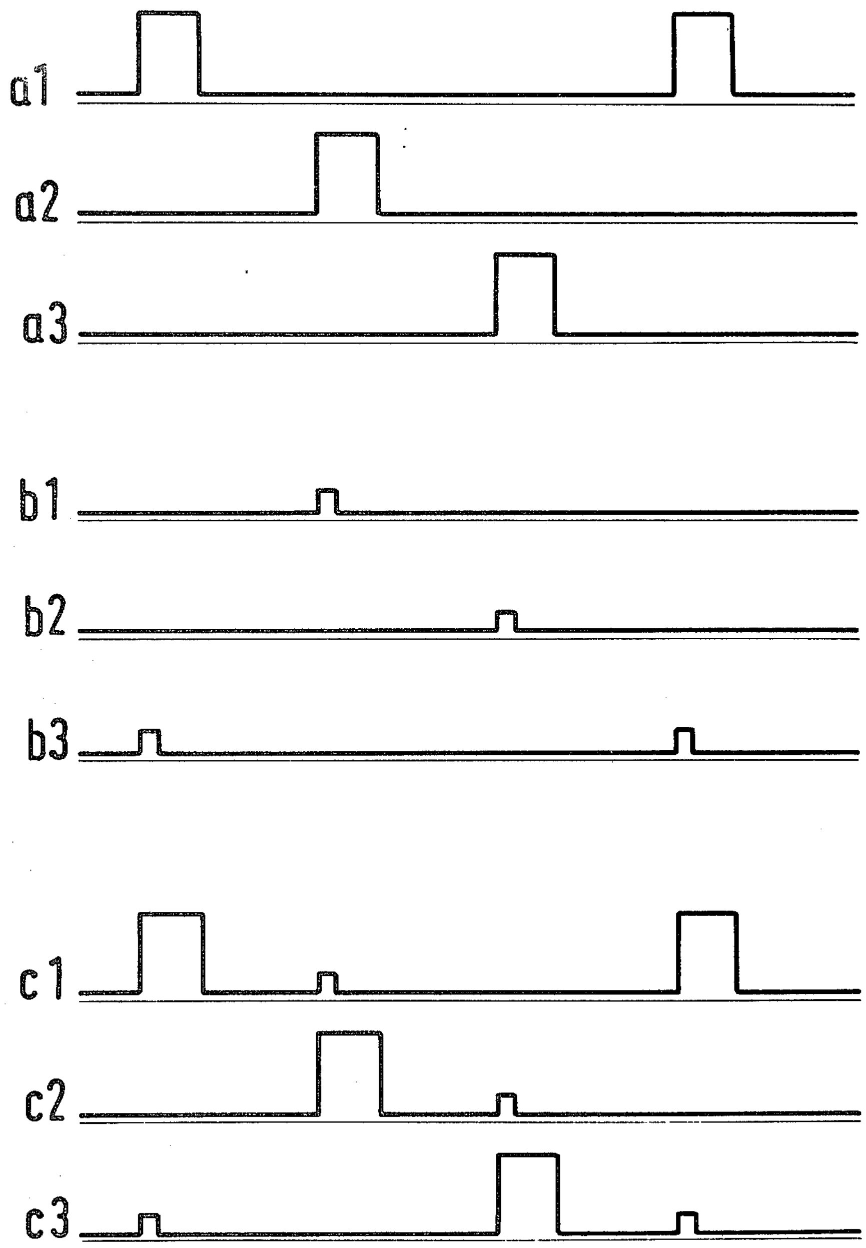
FIG. 2 is a pulse diagram illustrating the mode of operation of the device shown in FIG. 1.

The corresponding signals in FIG. 2 are illustrated in terms of a 3-cylinder marine Diesel engine. The diagrams in FIG. 2 labelled a1 through a3 show the control or trigger pulses, staggered in terms of time and based on the primary control unit, with which the magnetic valves are directed to open. In corresponding fashion, FIG. 2, b1 through b3, illustrates the simultaneously occurring output signals of the auxiliary control unit. These monitoring signals are shorter and have a smaller amplitude. The phase displacement between the primary and the auxiliary control signals may be clearly seen. This phase displacement is selected to be such that the auxiliary control unit triggers the cylinder coming next in the ignition sequence. Of course, the auxiliary control signal can be generated, in the alternative, 180° of a crankshaft rotation after the primary control signal. FIG. 2, c1 through c3, illustrates the sum of the pulses occurring at the individual valve windings. It is already clear from the drawing itself that the test pulses of the auxiliary control unit are substantially smaller and shorter in dimension than are the output signals of the primary control unit, and that these smaller and shorter signals are not sufficient for actuating the injection valves. The signal course of one of the three curves shown in FIG. 2c1–c3 appears at the connecting point 16 of the subject of FIG. 1; this simultaneously makes it clear that in the case where there is a large number of consumers—in the example shown above, the magnetic windings of injection valves—then the diodes 14, 15 and the connecting point 16 must likewise be realized in multiple fashion.

When the primary control unit (regulator 11) is functioning correctly, the pulses represented by the control signal courses shown in FIG. 2a1–a3 serve to direct the opening of the injection valves. If an error is recognized, then the former auxiliary control unit takes on the function of the former primary control unit; however, in this event, then a reversal of cylinder sequence must be made, because as shown in the drawings, the magnetic valves of different cylinders are triggered at the same instant by the primary and the auxiliary control units, and continuity in the sequence of injection must still be assured. In other words, if the auxiliary unit is switched on, the order of pulses is reversed from that unit. A reversal of order merely effects a time-shift in the signal applied to the engine from the auxiliary unit. This time-shifted signal resembles the original signal from the primary unit and thus avoids firing of the cylinders out of order.

Figure 3:
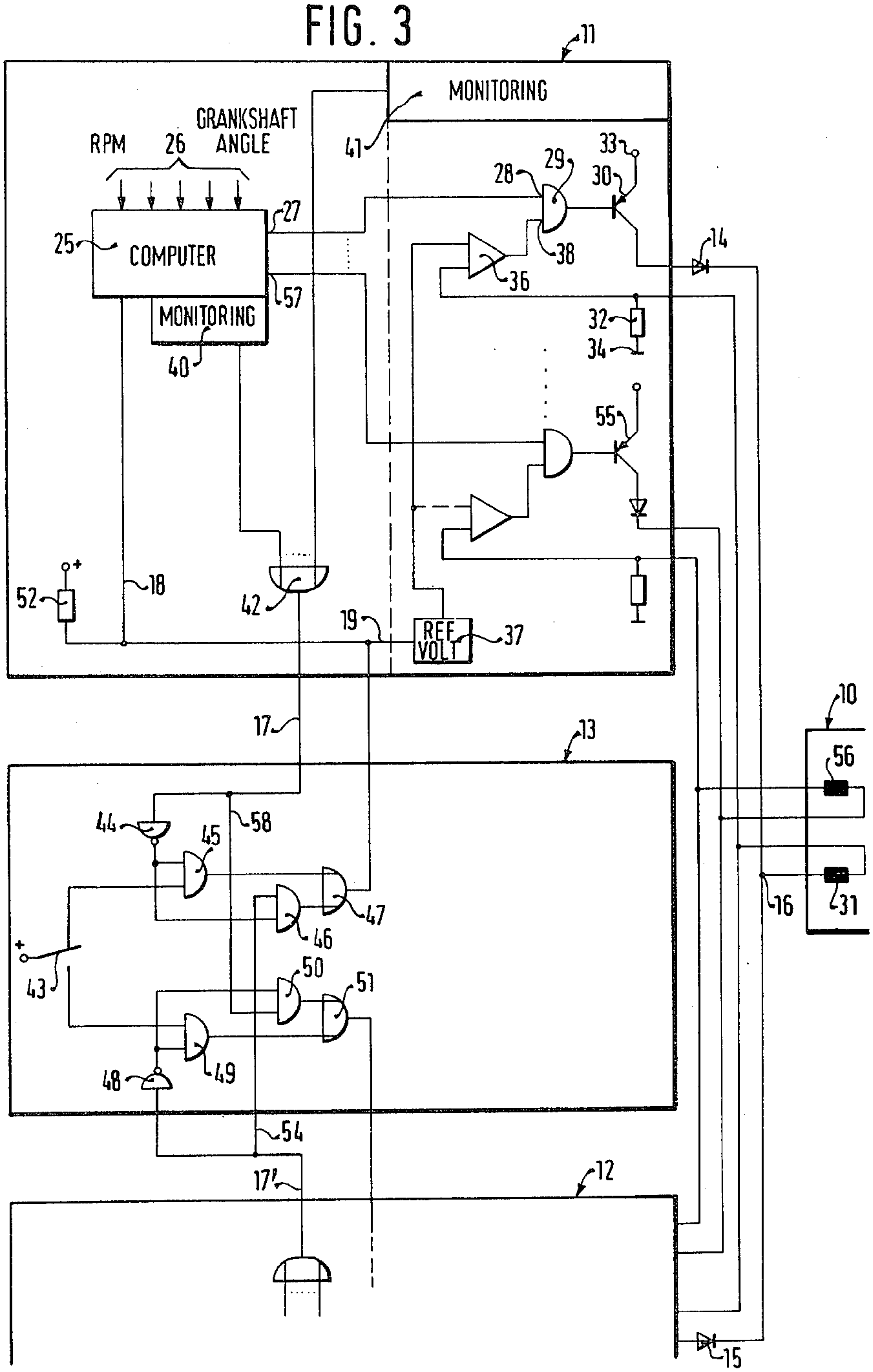
FIG. 3 is a somewhat more detailed block circuit diagram.

FIG. 3 shows the most important parts of the subject of FIG. 1 but in somewhat greater detail. The regulator or control unit 11 substantially comprises a computer 25, which on the basis of various input variables, such as rpm or crankshaft angle, present at the inputs 26 furnishes an injection signal corresponding to FIG. 2*a*, which is modulated in pulse width and is synchronized with the rpm. This signal proceeds from an output 27 to the first input 28 of an AND gate 29 preceeding an output transistor 30. The output transistor 30 is disposed in series with the uncoupling diode 14 and with an exciter winding 31 of an injection valve and of a measurement resistor 32 such that this series circuit is connected between two operating voltage terminals 33 and 34. The voltage drop over the measurement resistor 32 is detected and compared in a comparator 36 with the output signal of a reference voltage circuit 37; the result of this comparison proceeds to the second input 38 of the AND gate 29. As a result, the output current is limited to a constant value, dependent on the reference voltage (synchronized output stage).

In the control unit 11, there are various monitoring circuits: A first monitoring circuit 40 is coupled with the computer 25; a second monitoring circuit 41 monitors the mode of operation of the output stages. Their output signals proceed to an OR gate 42, the output of which is connected in turn with the connecting line 17.

The switchover device 13 includes a switch 43 for the initial selection of the primary and the auxiliary control unit, as well as a plurality of logic modules 44–51. The individual logic modules are provided in duplicate, for the sake of the required interchangeability between the two control units.

In the illustrated position of the switch 43, a positive signal proceeds to a first input of an AND gate 45, the second input of which is coupled via an inverter 44 with the connecting line 17 as well as directly with a first input of a further AND gate 46. The outputs of the two AND gates 45 and 46 are carried to an OR gate 47, the output of which determines the signal on the connecting lines 18 and 19 of the subject of FIG. 1. To this end, the output of the OR gate 47 is connected via a resistor 52 with a positive voltage terminal and the lines 18 and 19 are either at high or low potential, depending upon the output potential of the OR gate 47. The reference voltage circuit 37, which could be a voltage divider, for instance, in turn, is controlled in accordance therewith in order to effect a limitation of current (see the pulses in FIG. 2*b*), and furthermore a reversal of cylinder sequence and a limitation of pulse width are effected.

In order to exert influence on the upper portion of the subject of FIG. 3 as the result of an error indication on the part of the regulator or control unit 12, there is an error indication line 54 to the OR gate 46, beginning at the line 17′ between the second regulator 12 and the switchover device 13. The switchover logic (gates 44 through 51) in block 13, with the aid of the error indications on lines 17 and 17′ of the two regulators and of the selection switch 43, makes a selection between the two regulators. If there is a defect in the control unit acting as the primary unit at that time, then a switchover to the auxiliary control unit is automatically made, so long as the latter unit does not exhibit any defect. As such, the auxiliary and primary units are connected to operate in parallel fashion.

The linking of the other logic modules 48–41 in the switchover device 13 corresponds to that of the modules 44–47, because of the strict symmetry which pertains there.

A further output stage transistor 55 in the primary control unit 11 serves to represent a greater number of additional transistors switched in like fashion to transistor 30. The output stage transistor 55 controls a second illustrated magnetic valve 56 in the engine 10. Here, as well, the remainder of the circuitry is identical, beginning at a further output 57 of the computer 25.

The individual circuit layouts of the elements shown in block form in FIG. 3 are known per se, and accordingly need not be described in further detail herein. What is important is solely that in the primary control unit as shown in FIG. 2, no limitation is made of the consumer current in terms of amplitude or time. Thus, the output signal in the reference voltage circuit 37 must be selected to be sufficiently high.

If an error is detected and then indicated by means of a signal on the connecting line 17, then the logic element including modules 44–47 switches over; both the limitation in amplitude and the cylinder sequence reversal are then made. At the same time, via a control line 58 from the connecting line 17 to the AND gate 50, the former auxiliary control unit is switched over to become the primary control unit.

The principle described above of coupling two equal control units 11 and 12 to a consumer (in this specialized case, the magnetic windings of injection valves) without interposing switchover contacts may naturally also be applied to solve other problems as well, wherever a plurality of signal-generating units is similarly connected with a consumer. Because of the principle by which it operates, the device is particularly advantageously put to use in instances where even units which are not active must still be monitored continuously.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A device for generating repeated control signals for an electrical consumer, the device having:

a primary control unit which is connected to generate a first control pulse signal;

an auxiliary control unit which is connected to generate a second control pulse signal;

wherein the auxiliary control unit and the primary control unit are connected to operate in parallel, and wherein the second control pulse signal is phase shifted with respect to the first control pulse signal;

an electrical consumer which is connected to the primary and auxiliary control unit to receive continuously the first and second control pulse to regulate the electrical consumer;

a limiting unit to reduce the amplitude and/or pulse duration of the second control pulse signals of said auxiliary control unit;

an error recognition circuit connected to detect errors of the primary control unit;

a switchover device connected to the error recognition circuit, the primary control unit and the auxiliary control unit; and upon detection of errors by the error recognition circuit, the switchover device, at switchover instant, causes the limiting unit to reduce the amplitude and/or pulse duration of the first control pulse signals rather than the second control pulse signals, whereby the second control pulses regulate the electrical consumer.

2. A device as defined in claim 1 also including an rpm detector connected to the auxiliary control unit and the primary control unit, such that the phase shift between the first control pulse signal and the second control pulse signal depends on rpm.

3. A device as defined in claim 2 also including a crankshaft angle difference detector connected to the auxiliary control unit and the primry control unit such that the second control pulse signal occurs at a constant crankshaft angle difference with respect to the occurrence of the first control pulse signal.

4. A device as defined in claim 2, wherein the electrical consumer is an electromagnetic valve.

5. A device as defined in claim 3, wherein the electrical consumer is an electromagnetic valve.

6. A device as defined in claim 4, wherein the primary control unit has a signal generating circuit which produces the first control pulse signal which is detected for error by the error recognition circuit.

7. A device as defined in claim 6, wherein the signal generating circuit is a computer.

8. A device as defined in claim 4, wherein the error recognition circuit is connected to detect current consumed by the electrical consumer.

9. A device as defined in claim 6, wherein the error recognition circuit is connected to detect current consumed by the electrical consumer.

10. A device as defined in claim 5, wherein the primary control unit has a signal circuit which produces the first control pulse signal which is detected for error by the error recognition circuit.

11. A device as defined in claim 10, wherein the signal generating circuit is a computer.

12. A device as defined in claim 5, wherein the error recognition circuit is connected to detect current consumed by the electrical consumer.

13. A device as defined in claim 10, wherein the error recognition circuit is connected to detect current consumed by the electrical consumer.

14. A device as defined in claim 1, wherein the switchover device, auxiliary control unit and the primary control unit are also connected such that at the switchover instant the first control pulse signal is time-shifted in a varying manner with respect to the second control pulse signals.

15. A device as defined in claim 14, wherein at the switchover instant, the second control pulse signal sequence is interchanged with first control pulse signal sequence.

* * * * *